US012431161B1

(12) United States Patent
Zaitsu et al.

(10) Patent No.: US 12,431,161 B1
(45) Date of Patent: Sep. 30, 2025

(54) DATA STORAGE DEVICE WITH TRACK PITCH DETERMINATION FOR MITIGATING EFFECTS OF SERVO PATTERN DISTORTION

(71) Applicant: WESTERN DIGITAL TECHNOLOGIES, INC., San Jose, CA (US)

(72) Inventors: Hideki Zaitsu, Fujisawa (JP); So Ogiwara, Fujisawa (JP); Yoshio Soyama, Fujisawa (JP); Kei Yasuna, Fujisawa (JP); Shuji Nishida, Fujisawa (JP)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/617,883

(22) Filed: Mar. 27, 2024

(51) Int. Cl.
*G11B 5/55* (2006.01)
*G11B 5/596* (2006.01)
*G11B 19/04* (2006.01)
*G11B 20/10* (2006.01)

(52) U.S. Cl.
CPC ........ *G11B 5/59672* (2013.01); *G11B 5/5539* (2013.01); *G11B 19/045* (2013.01)

(58) Field of Classification Search
CPC ... G11B 5/09; G11B 5/5539; G11B 20/10388; G11B 27/36; G11B 5/556; G11B 5/5573; G11B 5/5543; G11B 20/1816; G11B 7/1263; G11B 5/012
USPC .......................................................... 360/75
See application file for complete search history.

(56) References Cited

U.S. PATENT DOCUMENTS

| | | | |
|---|---|---|---|
| 5,930,069 | A | 7/1999 | Kim |
| 6,052,250 | A | 4/2000 | Golowka et al. |
| 6,256,160 | B1 | 7/2001 | Liikanen et al. |
| 8,102,613 | B2 | 1/2012 | Duan et al. |
| 8,531,792 | B1 | 9/2013 | Burd et al. |
| 8,736,995 | B1 | 5/2014 | Wiesen et al. |
| 9,330,688 | B1 | 5/2016 | Zhu et al. |

(Continued)

FOREIGN PATENT DOCUMENTS

| | | |
|---|---|---|
| EP | 0903559 A2 | 3/1999 |
| EP | 2037460 A1 | 7/2008 |

(Continued)

OTHER PUBLICATIONS

Ma Kun, "Servo Pattern Enhancements for High Areal Density Hard Disk Drives", https://dr.ntu.edu.sg/bitstream/10356/72656/1/SERVO%20PATTERN%20ENHANCEMENTS%20FOR%20HIGH%20AREAL%20DENSITY%20HARD%20DISK%20DRIVES.pdf, School of Electrical & Electronic Engineering, Year 2017, 178 pages.

(Continued)

*Primary Examiner* — Nabil Z Hindi
(74) *Attorney, Agent, or Firm* — Calderon Safran & Wright P.C.

(57) ABSTRACT

Various illustrative aspects are directed to a data storage device, method, and one or more processing devices that are configured to: determine an initial track pitch based on a performance metric determined for the head; determine a track pitch adjustment based on a measure of servo pattern distortion associated with a region of the disk; and set a final track pitch for the region of the disk based on the track pitch adjustment and the initial track pitch.

21 Claims, 6 Drawing Sheets

(56) References Cited

U.S. PATENT DOCUMENTS

| | | | |
|---|---|---|---|
| 9,472,223 B1 | 10/2016 | Mendosa et al. | |
| 9,858,964 B1 * | 1/2018 | Wei | G11B 5/09 |
| 9,916,851 B1 | 3/2018 | Seigler et al. | |
| 10,748,567 B1 | 8/2020 | Zaitsu et al. | |
| 2020/0411050 A1 | 12/2020 | Ide et al. | |

FOREIGN PATENT DOCUMENTS

| | | |
|---|---|---|
| JP | 4154377 B2 | 9/2008 |
| WO | 2015041605 A1 | 3/2015 |

OTHER PUBLICATIONS

Mike Montemorra et al, "HDD Technology: History of the '747' Curve", Sep. 2018, 5 pages.

* cited by examiner

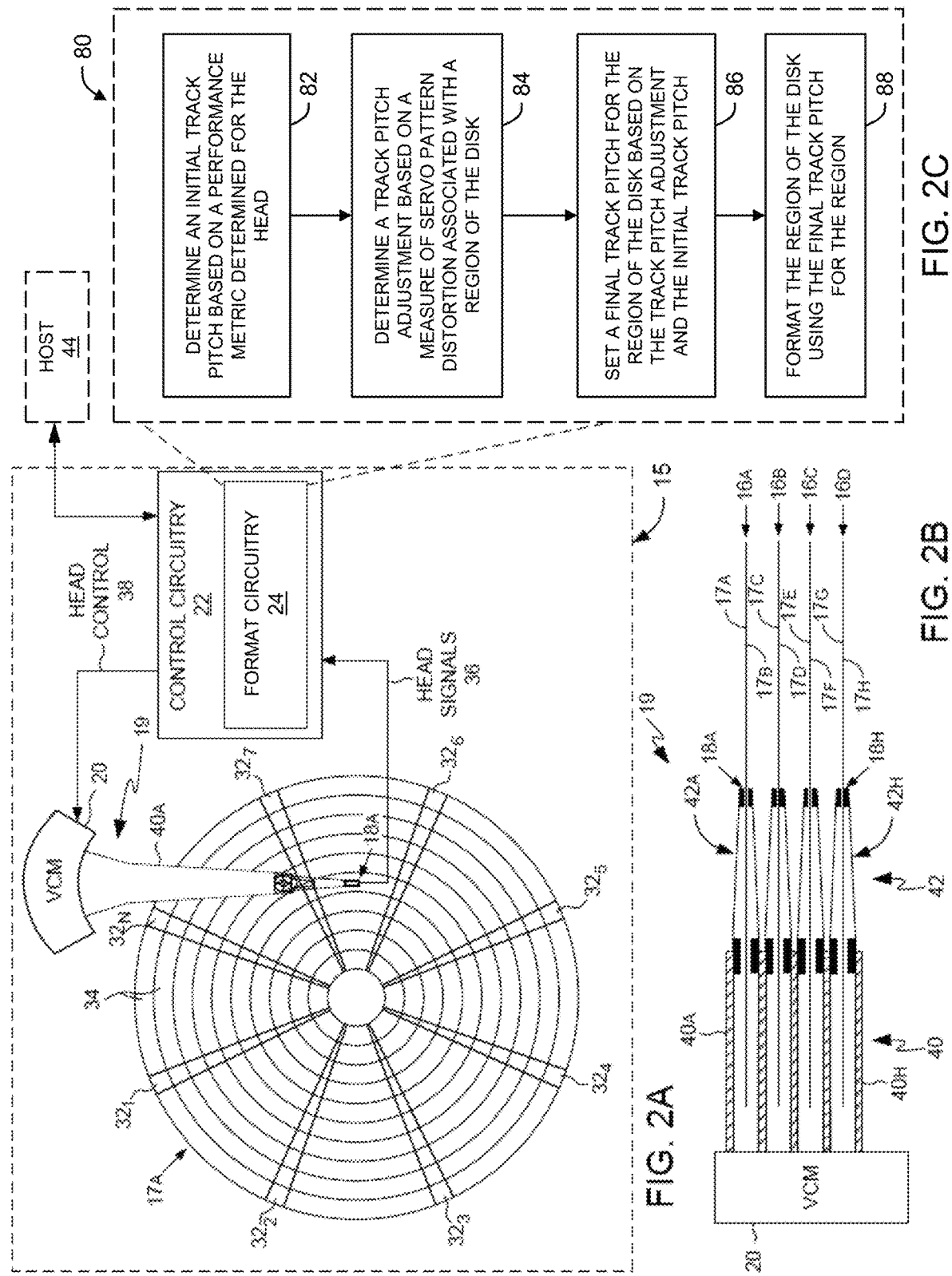

DATA STORAGE DEVICE WITH TRACK PITCH DETERMINATION FOR MITIGATING EFFECTS OF SERVO PATTERN DISTORTION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine control actuators such as milliactuators or microactuators, in some examples.

Some disk drives use heat to lower the effective coercivity of a localized region on the magnetic media surface and write data within this heated region. The data state becomes "fixed" upon cooling the media to ambient temperatures. This technique is broadly referred to as "thermally assisted (magnetic) recording" (TAR or TAMR), "energy assisted magnetic recording" (EAMR), or "heat-assisted magnetic recording" (HAMR). The term "HAMR" is used herein to refer to all of TAR, TAMR, EAMR, and HAMR.

In a HAMR disk drive, a magnetic recording material with high magneto-crystalline anisotropy (Ku) is heated locally during writing to lower the coercivity enough for writing to occur, but the coercivity/anisotropy is high enough that the recorded bits are thermally stable at the ambient temperature of the disk drive (the normal operating or "room" temperature of approximately 15-30 degrees Celsius). In some proposed HAMR systems, the magnetic recording material is heated to near or above its Curie temperature. The recorded data may then be read back at ambient temperature by a conventional magnetoresistive read head. HAMR disk drives have been proposed for both conventional continuous media, wherein the magnetic recording material is a continuous layer on the disk, and for bit-patterned media (BPM), in which the magnetic recording material is patterned into discrete data islands or "bits."

One type of HAMR disk drive uses a laser source and an optical waveguide coupled to a near-field transducer (NFT) for heating the recording material on the disk. A "near-field" transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air- or gas-bearing slider that also supports the read/write head and rides or "flies" above the disk surface. An evanescent wave generated at a surface of the waveguide couples to surface plasmons excited on the surface of the NFT, and a strong optical near-field is generated at the apex of the NFT output end. The NFT couples light onto the media at a spot of a size that is smaller than the optical diffraction limit, which heats a region of the media.

SUMMARY

Various examples disclosed herein provide data storage devices such as hard disk drives with control circuitry configured to perform novel and inventive track pitch determination for mitigating effects of servo pattern distortion caused, for example, by laser mode hop. In various examples, control circuitry of this disclosure is inventively configured to adjust the track pitch for a region of a disk based on an amount of servo pattern distortion determined for the region. The track pitch may be adjusted by a same amount for all tracks associated with a single head or may be adjusted differently for different bands of tracks associated with the head. A region of the disk having more poorly written servo patterns indicated by a higher measure of servo pattern distortion may thus be provided with a larger track pitch compared to a region of the disk having less poorly written servo patterns indicated by a lower measure of servo pattern distortion. Using a larger track pitch for regions having more poorly written servo patterns provides the servo system of the drive more margin to keep the head over the track during read and write operations. In this manner, implementations help mitigate negative effects of servo pattern distortion that may be caused by laser mode hop that occurs during writing of the servo patterns.

Various illustrative aspects are directed to a data storage device comprising: a disk; a head actuated over the disk; and one or more processing devices, individually or in combination, configured to: determine an initial track pitch based on a performance metric determined for the head; determine a track pitch adjustment based on a measure of servo pattern distortion associated with a region of the disk; and set a final track pitch for the region of the disk based on the track pitch adjustment and the initial track pitch.

Various illustrative aspects are directed to a method comprising: determining an initial track pitch based on a performance metric determined for the head; determining a track pitch adjustment based on a measure of servo pattern distortion associated with a region of the disk; and setting a final track pitch for the region of the disk based on the track pitch adjustment and the initial track pitch, wherein the determining the initial track pitch, the determining the track pitch adjustment, and the setting the final track pitch are performed by one or more processing devices individually or in combination.

Various illustrative aspects are directed to one or more processing devices comprising: means for determining an initial track pitch based on a performance metric determined for the head; means for determining a track pitch adjustment based on a measure of servo pattern distortion associated with a region of the disk; and means for setting a final track pitch for the region of the disk based on the track pitch adjustment and the initial track pitch.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that read/write channel circuitry of control circuitry of a disk drive may perform or execute in controlling the operations of the disk drive, in accordance with aspects of the present disclosure.

DETAILED DESCRIPTION

Figure 1:
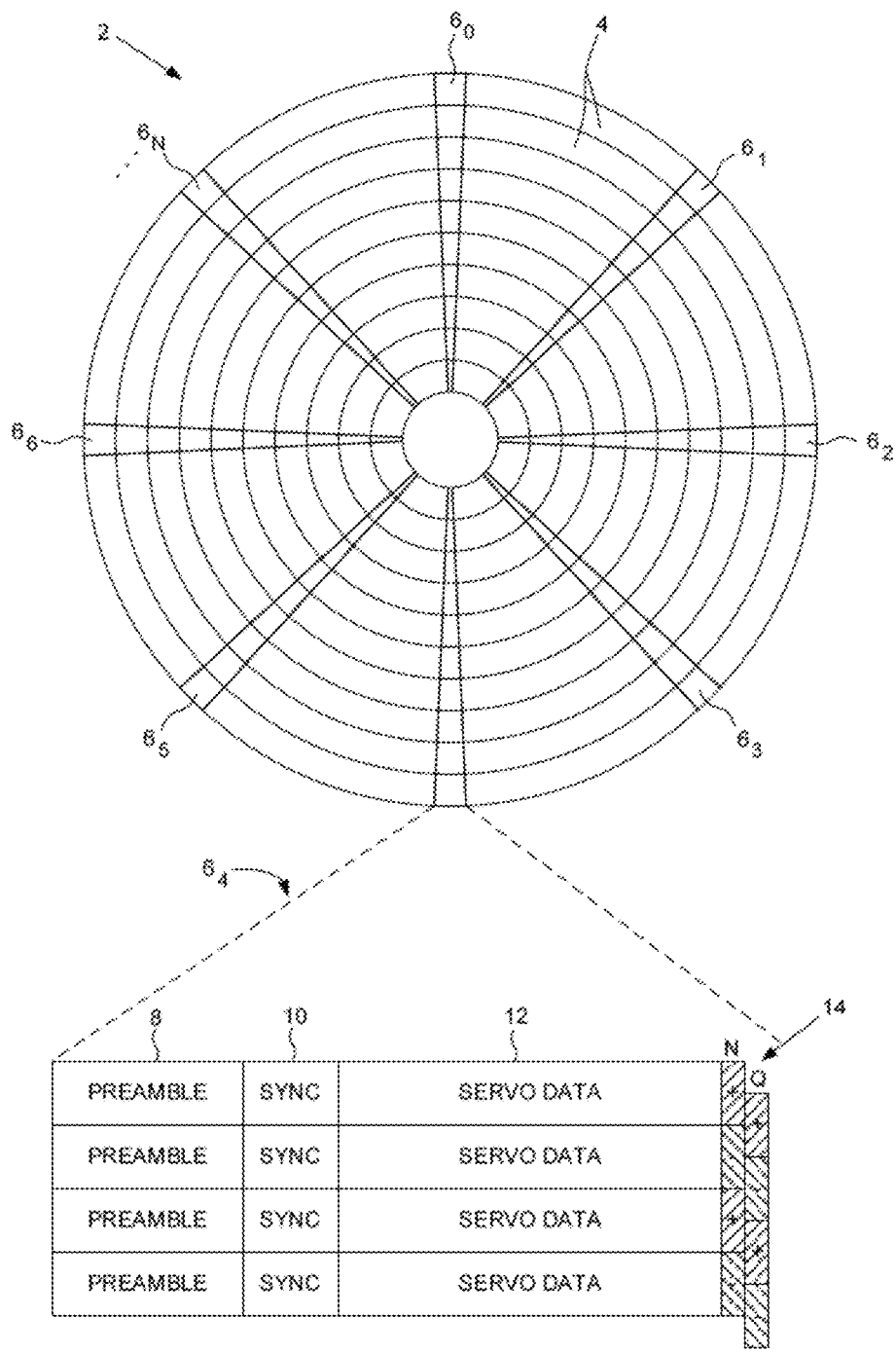
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that format circuitry 24 of control circuitry 22 may perform or execute in controlling the operations of disk drive 15, in accordance with aspects of the present disclosure, including track pitch determination for mitigating effects of servo pattern distortion in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend a read/write head 18 in close proximity over a corresponding disk surface 17 (e.g., read/write head 18A suspended by topmost actuator arm 40A over topmost corresponding disk surface 17A, read/write head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one actuator in the form of VCM 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17. As used herein, a head 18 may be said to operate "above" a corresponding disk surface 17 in terms that define the local frame of reference in accordance therewith.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. In some examples, each of the two actuator arm assemblies may control half of the heads, and write to and read from half of the disk surfaces. In some examples, each of the actuator arm assemblies may be addressable by host 44 as a separate logical data storage unit. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In a particular example, format circuitry 24 of control circuitry 22 may determine an initial track pitch based on a performance metric determined for the head (82). Format circuitry 24 may further determine a track pitch adjustment based on a measure of servo pattern distortion associated with a region of the disk (84). Format circuitry 24 may further set a final track pitch for the region of the disk based on the track pitch adjustment and the initial track pitch (86). Format circuitry 24 may further format the region of the disk using the final track pitch for the region (88). Format circuitry 24, may further perform additional actions, methods, and techniques, in accordance with various aspects including as further described herein.

The term "format circuitry 24" as used herein may refer to any hardware, firmware, software, and/or combination thereof, comprised in control circuitry 22 of disk drive 15, which implements, embodies, or engages in any of the structures or functions ascribed herein to format circuitry 24 or to any other of the novel and inventive aspects of the present disclosure. Format circuitry 24 may constitute any hardware, firmware, software, and/or any other elements of control circuitry 22 for performing data rack pitch determination for mitigating effects of servo pattern distortion caused by laser mode hop, and performing other techniques and methods as described herein.

In embodiments, disk drive 15 comprises a HAMR disk drive. HAMR disk drives enable high-quality written data at high densities enabled by a high-coercivity medium of a disk surface, such as, e.g., superparamagnetic iron-platinum nanoparticles, by heating the disk surface with a laser emitted by a laser diode during write operations. Such heating of the disk surface decreases the coercivity of the magnetic medium of the disk surface, thereby enabling the magnetic field generated by the write coil of a write element to magnetize the temporarily heated area of the disk surface. The disk surface encoding the data thus written then cools back down and thereby returns to heightened magnetic coercivity, which durably preserves the written data at higher density than is possible in conventional techniques such as perpendicular magnetic recording (PMR).

Figure 2D:
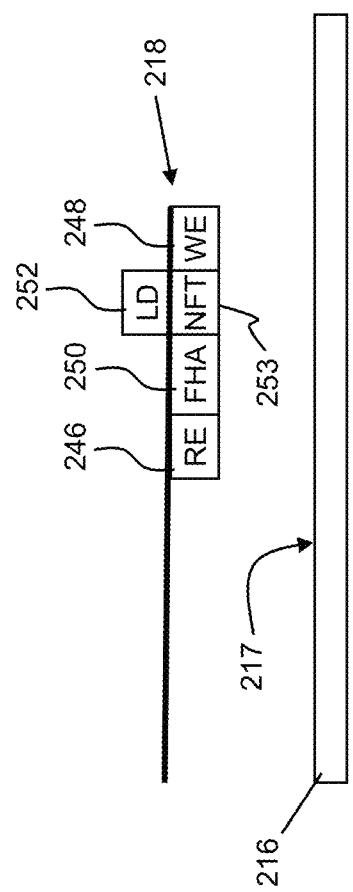
FIG. 2D depicts an example head usable in a HAMR disk drive in accordance with aspects of the present disclosure.

FIG. 2D depicts an example head 218 usable in a HAMR disk drive. In particular, FIG. 2D shows a disk 216 that corresponds to one of disks 16 of FIG. 2B and a head 218 that corresponds to one of heads 18 of FIG. 2B. The arrangement or disposition of elements of heads 18 of FIG. 2B described herein is not limited to any specific detail as shown in FIG. 2D, and the elements of heads 18 of FIG. 2B may be arranged in any of a variety of other configurations in other examples.

With continued reference to FIG. 2D, in embodiments head 218 includes a read element 246 (e.g., a magnetoresistive (MR) element), a write element 248 (e.g., an inductive write coil), a fly height actuator 250 (e.g., a thermal fly height control (TFC) element that actuates through thermal expansion or a piezoelectric actuator that actuates through mechanical deflection), and a laser diode 252. Control circuitry 22 (shown in FIG. 2A) writes data to disk surface 217 by modulating a write current in an inductive write coil in write element 248 to record magnetic transitions onto corresponding disk surface 217 in a process referred to as saturation recording. During readback, read element 246 senses the magnetic transitions, and a read channel demodulates the resulting read signal. Control circuitry may use fly height actuator 250 to induce changes in the fly height of head 218 above disk surface 217. Laser diode 252 may be used to generate a laser that is used to temporarily heat an area of disk surface 217 prior to passing under write element 248, as is understood in a HAMR disk drive. For example, laser diode 252 may be used with a waveguide and a near-field transducer (NFT) 253 to project a plasmon onto disk surface 217 to heat an area of disk surface 217. Head 218 may be included in a HAMR disk drive, which enables high-quality written data at high densities enabled by a high-coercivity medium of a disk surface, such as, e.g., superparamagnetic iron-platinum nanoparticles, by heating disk surface 217 with a laser emitted by laser diode 252 via a waveguide (not shown) and NFT 253 during write operations. Such heating of disk surface 217 decreases the coercivity of the magnetic medium of disk surface 217, thereby enabling the magnetic field generated by the write coil of write element 248 to magnetize the temporarily heated area of disk surface 217. Disk surface 217 encoding the data thus written then cools back down and thereby returns to heightened magnetic coercivity, which durably preserves the written data at higher density than is possible in conventional techniques such as perpendicular magnetic recording (PMR).

HAMR disk drives are susceptible to the phenomenon of mode hop (also called laser mode hop, mode hopping, and laser mode hopping) in which the output of the laser diode changes suddenly and unpredictably. In the example of FIG. 2D, when power (e.g., driving current) is applied to laser diode 252 during write operations, laser diode 252 may exhibit sudden and unpredictable changes between two or more available modes in which it emits a laser, due to the inherent physics of laser emission, which cause transients, or sudden shifts in magnitude, in output power of the laser being emitted by laser diode 252. Because such laser mode hopping can create sudden, unpredictable changes in the laser power, laser mode hopping may also cause sudden, unpredictable write width changes, even while the write current applied to write element 248 remains constant. That is, a greater or lesser width across the disk surface 217 may be susceptible to the constant write current in response to the laser suddenly becoming more or less powerful, respectively. When such changes in write width occur during servo write (i.e., when writing servo bursts to the disk), laser mode hopping may cause distortion of servo patterns in a servo wedge. Such distortion of the servo patterns may be referred to as DC bimodal distortion, or simply as "DC bimodal," and may result in degraded operational issues of disk drive 15 such as DC squeeze (also called track squeeze) and/or large repeatable runout (RRO) error. Laser mode hopping is thus an undesirable characteristic of HAMR systems and has proven difficult to eliminate. Accordingly, aspects of the present disclosure are directed to systems and methods that mitigate the impact of servo pattern distortion caused by laser mode hopping, among other advantages.

Figure 3:
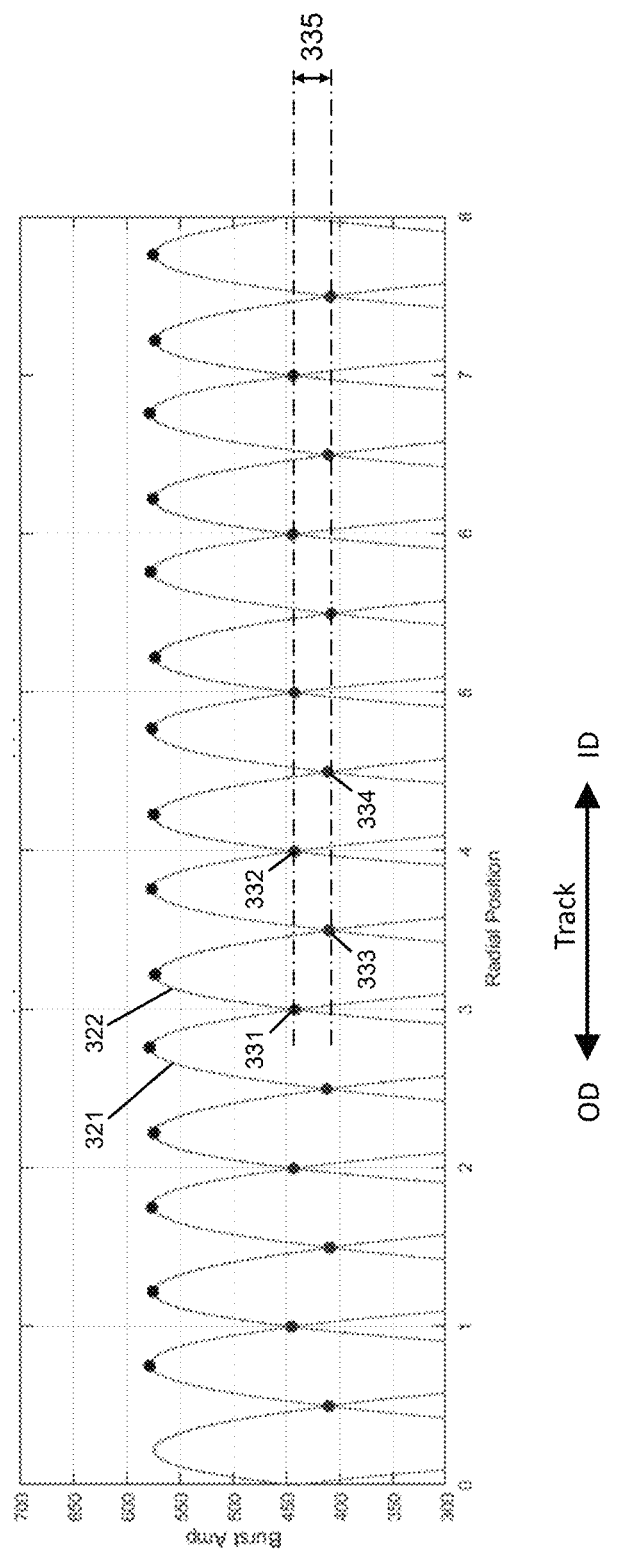
FIG. 3 shows an exemplary cross-track profile of servo burst signals that result from distortion of a servo pattern caused by laser mode hop.

FIG. 3 shows an exemplary cross-track profile of servo burst signals 321, 322 of the Q burst and the N burst (e.g., similar to bursts 14 of FIG. 1) that result from distortion of a null burst servo pattern caused by laser mode hop occurring during writing of the servo pattern. Servo burst signals 321, 322 are generated from reading the servo bursts in a servo pattern, e.g., using read element 246 of FIG. 2D. In the example shown in FIG. 3, the Q burst edge is placed on the inner diameter (ID) side relative to the N burst edge by a shift amount. As shown in FIG. 3, due to the radially shifted profile of one burst signal relative to the other burst signal, the amplitude of the crossing levels 331, 332 at the integer locations differs from the amplitude of the crossing levels 333, 334 at the half-integer locations, as indicated by delta 335. This cross-point split (also referred to as DC bimodal herein) results from laser mode hop occurring during writing of the null burst pattern and leads to distortion of fractional servo pattern track position scale as well as undesirable DC track misregistration. Delta 335 having a magnitude of zero indicates that mode hop did not occur in the region corresponding to the pair of bursts in the null burst pattern. Delta 335 having a magnitude of greater than zero indicates that mode hop occurred in the region corresponding to the pair of bursts in the null burst pattern. The greater the magnitude of delta 335, the greater the degree of DC bimodal and the greater the detrimental effect resulting from the mode hop. The magnitude of delta 335 is thus usable as a measure of servo pattern distortion associated with the track.

In accordance with aspects of the present disclosure, a measure of servo pattern distortion may be determined for each track of a disk. A track contains plural servo sectors each containing a servo pattern, and each individual servo pattern may have a different measure of servo pattern distortion determined based on a difference between crossing level amplitudes of a first servo burst signal profile and a second servo burst signal profile generated by reading the servo pattern (e.g., as illustrated by delta 335 of FIG. 3). In embodiments, the measure of servo pattern distortion for a track may be set as the largest one of the measures of servo pattern distortion of the plural servo patterns in the track.

In accordance with aspects of the present disclosure, a measure of servo pattern distortion may be determined for each region (e.g., band) of a disk. A region of a disk contains plural tracks, each track having a respective measure of servo pattern distortion as described above. In embodiments, the measure of servo pattern distortion for a region of the disk may be set as the largest one of the measures of servo pattern distortion of the plural tracks in the region. In one example, a region comprises all the tracks associated with a single head. In another example, a region comprises a subset of all the tracks associated with a single head. Respective subsets of tracks associated with a head may be referred to as bands. In accordance with aspects of the present disclosure, different bands associated with a same head may have different measures of servo pattern distortion determined as described herein. The respective measures of servo pattern distortion may be determined when the disk drive is manufactured, e.g., by measuring a value of delta (e.g., similar to delta 335 of FIG. 3) associated with servo burst signal profiles of a servo pattern after writing the servo patterns to the disk. The values may be converted via a desired mathematical function or transformation (e.g., scaled, normalized, etc.) to a desired scale and range.

Various embodiments use the measure of servo pattern distortion in determining a track pitch for a region of the disk. In one example, an initial track pitch is determined, and that initial track pitch is increased by an amount that is based on the measure of servo pattern distortion for the region. In embodiments, a region with a higher measure of servo pattern distortion has its initial track pitch is increased by a larger amount than a region with a lower measure of servo pattern distortion. In this manner, the track pitch of a region may be tailored based on the amount of servo pattern distortion associated with the region. Increasing track pitch based on a measure of servo pattern distortion in this manner reduces the impact of laser mode hop on quality by providing the servo system with more margin to keep the head over the track during read and write operations, thus avoiding track misregistration. Moreover, by increasing track pitch by different amounts in different regions based on different measures of servo pattern distortion for the regions, embodiments also minimize a negative impact on capacity by avoiding a one-size-fits-all approach.

Figure 4:
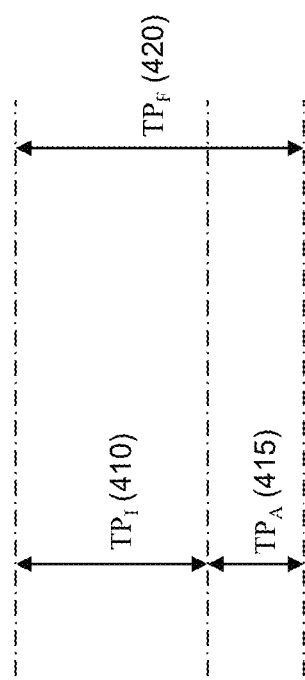
FIG. 4 shows a relationship between an initial track pitch, a track pitch adjustment, and a final track pitch in accordance with aspects of the present disclosure.

In various embodiments, and as illustrated in FIG. 4, control circuitry 22 including format circuitry 24 is configured to set a final track pitch $TP_F$ 420 for a region of a disk of a HAMR disk drive by: determining an initial track pitch $TP_I$ 410 of the disk based on a performance metric determined for a head associated with the disk; determining a track pitch adjustment for a region of the disk associated with the head, where the track pitch adjustment $TP_A$ 415 is determined based on a measure of servo pattern distortion associated with the region of the disk; and defining the final track pitch $TP_F$ 420 for the region of the disk by summing the track pitch adjustment $TP_A$ 415 and the initial track pitch $TP_I$ 410. The relationship between the initial track pitch $TP_I$ 410, the track pitch adjustment $TP_A$ 415, and the final track pitch $TP_F$ 420 may be represented by the expression:

$$TP_F = TP_I + TP_A \quad (1)$$

Control circuitry 22 including format circuitry 24 may format the region of the disk using the final track pitch $TP_F$ 420, such that the data tracks in the region have a track pitch equal to the final track pitch $TP_F$ 420. Formatting may include determining a bits per inch (BPI) and tracks per inch (TPI) format based on the final track pitch $TP_F$ 420 and formatting data tracks in the region using the determined BPI and TPI. As described previously, different regions (e.g., bands) associated with the head may each have a different final track pitch $TP_F$ 420 due to the different regions each having a different measure of servo pattern distortion. The disk drive may comprise disk drive 15 of FIG. 2A, the disk may comprise one of disks 16 of FIG. 2B, and the head may comprise one of the heads 18 of FIG. 2B, wherein the head is associated with the disk in that the head is used to perform read and write operations on the disk. As used herein, the phrases "track pitch," "initial track pitch," and "final track pitch" refer to data track pitch, which is separate from a servo track pitch that is defined during a servo write process.

In embodiments, the initial track pitch $TP_I$ 410 of the disk is determined based on a performance metric associated with the head and the disk. In one example, the performance metric is an off-track capability (also called off-track capacity or OTC) and the initial track pitch $TP_I$ 410 is an OTC track pitch that ensures a predefined soft error rate (SER) at off-track locations. In this example, the initial track pitch $TP_I$ 410 (i.e., the OTC track pitch) may be determined by measuring performance of the head and disk combination to create a "747 curve" that plots OTC with respect to squeeze track pitch for a given SER threshold, and using the curve to select a track pitch that satisfies a target OTC value. A track pitch selected in this manner may be used as the initial track pitch $TP_I$ 410. OTC is one example of a performance metric associated with a head and a disk that may be used to determine the initial track pitch $TP_I$ 410, and embodiments may use other performance metrics associated with a head and a disk to determine the initial track pitch $TP_I$ 410.

In embodiments, the track pitch adjustment $TP_A$ 415 for a region of the disk is determined based on a measure of servo pattern distortion associated with the region of the disk. In one example, and as described above, the measure of servo pattern distortion is determined based on a difference between crossing level amplitudes of a first servo burst signal profile and a second servo burst signal profile associated with the track, e.g., by measuring a value of delta (e.g., similar to delta 335 of FIG. 3) associated with the servo burst signal profiles of a servo pattern. The track pitch adjustment $TP_A$ 415 may be represented by the expression:

$$TP_A = f(D) \quad (2)$$

In Expression 2, D represents the measured value of delta (e.g., similar to delta 335 of FIG. 3) such that the track pitch adjustment $TP_A$ 415 is determined as a function of D. In this manner, a magnitude of the track pitch adjustment $TP_A$ 415 is a function of the measure of servo pattern distortion. Various types of functions may be used, including but not limited to proportional, exponential, multidimensional function, or other function. In embodiments, the function may be based on D alone or may be based on D and one or more additional parameters that are selected to achieve desired performance characteristics of the disk drive. Other parameters may include but are not limited to: an amount of gain by a data recovery process; a value based on head positioning accuracy; a margin for read and write performance degradation based on temperature of the disk drive; a margin for media non-uniformity and data recovery process gain variation; and a margin for laser power fluctuation in data writing. Various ones of these other parameters may be determined based on measurements performed using the particular head and disk, may be determined based on averages of measurements performed using plurals heads and disks, or may be determined theoretically. In both embodiments (i.e., whether the function is based on D alone or based on D and one or more additional parameters), the function may be configured to calculate a value of the track pitch adjustment $TP_A$ 415 that is normalized relative to a scale associated with the initial track pitch $TP_I$ 410, which permits the respective values of the initial track pitch $TP_I$ 410 and the track pitch adjustment $TP_A$ 415 to be summed for determining the final track pitch $TP_F$ 420.

Figure 5:
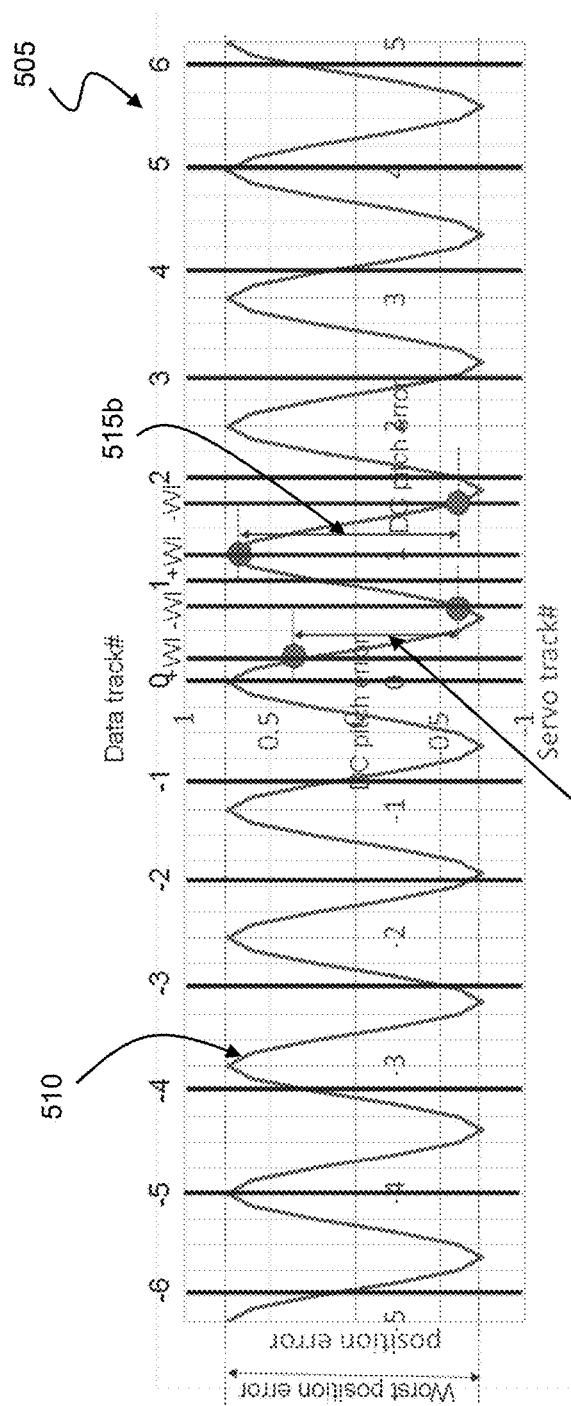
FIG. 5 shows a chart of position error versus radial direction in accordance with aspects of the present disclosure.
Figure 6:
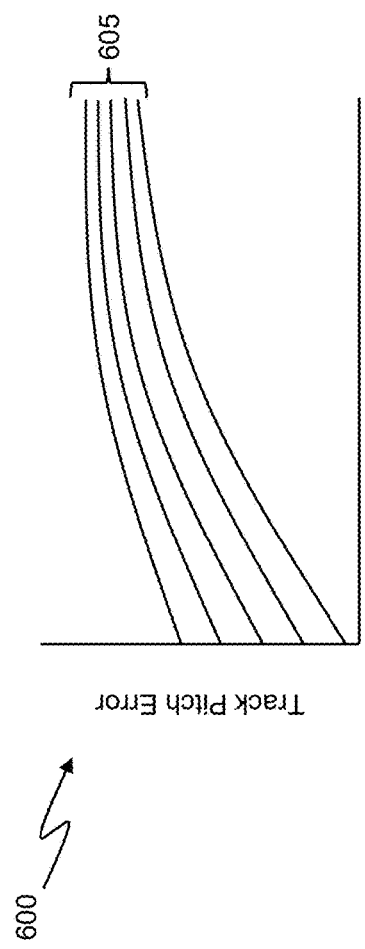
FIG. 6 shows a chart that expresses track pitch error versus initial data track pitch for a number of different servo track pitches in accordance with aspects of the present disclosure.

In one exemplary embodiment, the function in Expression 2 is based on D, a servo track pitch, and a data track pitch. When a servo pattern is distorted by mode hop, the actual head position error from a PES position has periodic behavior by servo track pitch in a radius direction as illustrated by plot 510 in chart 505 FIG. 5. In chart 505, the vertical axis represents position error, and the horizontal axis represents the radial direction of the disk. A positive value of position error of plot 510 corresponds to the head position shifting in an inner radius direction from a PES position, and negative value of position error of plot 510 corresponds to the head position shifting in an outer radius direction from the PES position. Distance between tracks is a factor used to avoid a read error. In a disk drive, when the head exhibits a sufficiently large offtrack condition, as defined by a write inhibit measure (WI), the write is aborted. The disk drive may be designed to guarantee readability even if two tracks are offset by WI. When both tracks are shifted by WI and position error by mode hop exists, track distance by PES position has an error compared to the actual track distance. The error is shown in chart 505 as distances 515a and 515b, referred to as DC pitch error, between the points on plot 510 where the plot intersects plus (+) WI and minus (−) WI positions. The largest value of the DC pitch error, e.g., distance 515b in this example, depends on the difference between servo track pitch and initial data track pitch. In embodiments, the servo track pitch and the initial data track pitch are different, and the DC pitch error is expressed based on a function of each of the servo track pitch and the initial data track pitch, for example in a chart such as chart 600 shown in FIG. 6, which expresses DC pitch error (e.g., Track Pitch Error) associated with mode hop in a servo pattern versus initial data track pitch (e.g., Data TPI) for a number of different servo track pitches each represented by one of plots 605.

In various embodiments, control circuitry 22 including format circuitry 24 determines the track pitch adjustment $TP_A$ 415 based on a worst DC pitch error in situations when the amplitude of position error (i.e., plot 510), the servo track pitch, and initial data track pitch are known. In one example, an amplitude of position error (referred to as "worst position error") is estimated based on the measure of servo pattern distortion using a predefined plot fit to empirical values. In this example, the track pitch adjustment $TP_A$ 415 is defined as "Eff" multiplied by the "worst position error" where Eff is determined using a chart such as chart 600 that expresses the expresses DC pitch error as a function of each of the servo track pitch and the initial data track pitch. In this manner, the track pitch adjustment $TP_A$ 415 may be determined based on the servo track pitch, the initial data track pitch, and the measure of servo pattern distortion.

In various embodiments, the servo track pitch is constant and initial data track pitch depends on the head and media. In one embodiment, Eff is defined by a constant value considering data track pitch distribution in all heads and bands. In another embodiment, Eff is defined as value for data track pitch of each head and band.

Aspects of the present disclosure have been described thus far with respect to systems and methods that mitigate the impact of servo pattern distortion caused by laser mode hopping in HAMR disk drives. However, embodiments are not limited to servo pattern distortion caused by laser mode hopping in HAMR disk drives. Rather, embodiments may similarly be used to mitigate the impact of servo pattern distortion in non-HAMR disk drives, where the distortion is caused by some reason other than laser mode hop, and wherein a measure of the servo pattern distortion is determined.

Aspects of the present disclosure have been described thus far with respect to a measure of the servo pattern distortion determined for a servo pattern having two servo bursts, e.g., a Q burst and a N burst. However, embodiments are not limited to servo patterns having two types of servo bursts. Rather, embodiments may similarly be used with servo patterns having other numbers of servo bursts, such as 3 bursts, 4 bursts, etc., and wherein the measure of the servo pattern distortion is determined in accordance with the number of bursts in the servo burst pattern.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprise logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method. Steps of method 80, and other methods of this disclosure, may be performed individually or in combination by one or more processing devices. For example, in some implementations, the one or more processing devices may comprise a single processing device that performs all the steps of such a method. In some implementations, different respective ones of the one or more processing devices may perform different respective steps of such a method. For example, in some implementations, the one or more processing devices may comprise at least a first processing device that performs a first subset of the steps of such a method and at least a second processing device that performs a second subset of the steps of the method. In some implementations, one or more steps of such a method may be performed by two or more of the one or more processing devices acting in combination.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
   a disk;
   a head actuated over the disk; and
   one or more processing devices, individually or in combination, configured to:
   determine an initial track pitch based on a performance metric determined for the head;
   determine a track pitch adjustment based on a measure of servo pattern distortion associated with a region of the disk; and
   set a final track pitch for the region of the disk based on the track pitch adjustment and the initial track pitch.

2. The data storage device of claim 1, wherein the servo pattern distortion is caused by laser mode hop occurring during writing of servo patterns in the region of the disk.

3. The data storage device of claim 1, wherein the measure of servo pattern distortion is determined based on a difference between crossing level amplitudes of a first servo burst signal profile and a second servo burst signal profile associated with the region of the disk.

4. The data storage device of claim 1, wherein the region of the disk includes all tracks associated with the head.

5. The data storage device of claim 1, wherein:
plural bands of tracks are associated with the head; and
the region of the disk includes one of the plural bands.

6. The data storage device of claim 5, wherein the one or more processing devices are further configured to:
determine a respective track pitch adjustment for each respective one of the plural bands; and
define a respective final track pitch for each respective one of the plural bands based on the initial track pitch and the respective track pitch adjustment for each respective one of the plural bands.

7. The data storage device of claim 1, wherein a magnitude of the track pitch adjustment is a function of the measure of servo pattern distortion.

8. The data storage device of claim 1, wherein the one or more processing devices are further configured to format the region of the disk using the final track pitch for the region of the disk.

9. The data storage device of claim 1, wherein the performance metric comprises off-track capability that ensures a predefined soft error rate at off-track locations.

10. The data storage device of claim 1, wherein the track pitch adjustment is based on the measure of servo pattern distortion, a servo track pitch, and an initial data track pitch.

11. The data storage device of claim 1, wherein the setting the final track pitch comprises summing the track pitch adjustment and the initial track pitch.

12. A method comprising:
determining an initial track pitch based on a performance metric determined for a head;
determining a track pitch adjustment based on a measure of servo pattern distortion associated with a region of a disk; and
setting a final track pitch for the region of the disk based on the track pitch adjustment and the initial track pitch,
wherein the determining the initial track pitch, the determining the track pitch adjustment, and the setting the final track pitch are performed by one or more processing devices individually or in combination.

13. The method of claim 12, wherein:
the servo pattern distortion is caused by laser mode hop occurring during writing of servo patterns in the region of the disk;
the measure of servo pattern distortion is determined based on a difference between crossing level amplitudes of a first servo burst signal profile and a second servo burst signal profile associated with the region of the disk; and
a magnitude of the track pitch adjustment is a function of the measure of servo pattern distortion.

14. The method of claim 12, wherein the region of the disk includes all tracks associated with the head.

15. The method of claim 12, wherein:
plural bands of tracks are associated with the head; and
the region of the disk includes one of the plural bands.

16. The method of claim 15, further comprising:
determining a respective track pitch adjustment for each respective one of the plural bands; and
setting a respective final track pitch for each respective one of the plural bands based on the initial track pitch and the respective track pitch adjustment for each respective one of the plural bands.

17. One or more processing devices comprising:
means for determining an initial track pitch based on a performance metric determined for a head;
means for determining a track pitch adjustment based on a measure of servo pattern distortion associated with a region of a disk; and
means for setting a final track pitch for the region of the disk based on the track pitch adjustment and the initial track pitch.

18. The one or more processing devices of claim 17, wherein:
the servo pattern distortion is caused by laser mode hop occurring during writing of servo patterns in the region of the disk;
the measure of servo pattern distortion is determined based on a difference between crossing level amplitudes of a first servo burst signal profile and a second servo burst signal profile associated with the region of the disk; and
a magnitude of the track pitch adjustment is a function of the measure of servo pattern distortion.

19. The one or more processing devices of claim 17, wherein the region of the disk includes all tracks associated with the head.

20. The one or more processing devices of claim 17, wherein:
plural bands of tracks are associated with the head; and
the region of the disk includes one of the plural bands.

21. The one or more processing devices of claim 17, further comprising:
means for determining a respective track pitch adjustment for each respective one of the plural bands; and
means for setting a respective final track pitch for each respective one of the plural bands based on the initial track pitch and the respective track pitch adjustment for each respective one of the plural bands.

* * * * *